Patented Oct. 5, 1943

2,331,049

UNITED STATES PATENT OFFICE 2,331,049

DRILLING MUD

Hans Schindler, Evanston, Ill., assignor to The Pure Oil Company, Chicago, Ill., a corporation of Ohio No Drawing. Application April 17, 1941, Serial No. 388,983

8 Claims. (Cl. 252—8.5)

This invention relates to drilling wells and is primarily concerned with the production of an improved drilling mud for use in the drilling of wells, especially oil and gas wells and with the method of drilling wells wherein such muds are used.

Drilling operations are usually conducted in the presence of a circulation of mud, that is, water containing mineral matter such as clay in a finely divided or deflocculated state. Such drilling muds are used in almost all rotary drilling operations for deep wells for oil and gas and simultaneously serve several functions. The mud is used primarily to carry the cuttings from the hole and to lubricate the drill bit, and in addition provides a lining or sheath on the walls of the drill hole to prevent either flow of water or gas from the sub-surface formation into the drill hole or to prevent loss of drilling fluid from the hole into the formations through which the hole is drilled. These muds are frequently made from material native to the formation in which the well is drilled, although it is often necessary to add additional material to the mud to vary the characteristics of the mud such as weighting agents which increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling purposes the fine material is predominant and is in an indefinitely fine state of subdivision, the finest being so small that much or most of it can be said to be in the form of a colloidal suspension or dispersion when the clay has been thoroughly mixed with water. The suspended particles obey the general rules of colloidal dispersions, the degree of dispersion being increased by some ions and chemicals and being decreased by others. An increase in the degree of dispersion is termed "deflocculation" and a decrease in the state of dispersion is termed "flocculation." Flocculated clay may be in an equally finely divided state to that of deflocculated clay but the flocculated material will come together in flocculent, loose clumps or aggregates which settle readily from the medium in which it is dispersed, which in the case of drilling muds, is generally water.

The general principles of the rotary method of drilling wells are well known in the art. It is also known in the art that it is possible to control such properties as sand content, viscosity and gel strength in muds used in rotary drilling operations by the incorporation of various additives. The viscosity and gel strength are particularly important and must be controlled within reasonable limits in order that the mud can perform satisfactorily its functions of removing formation cuttings from the well, releasing these cuttings in settling pits provided at the surface, lubricating the bit, preventing caving of loose formations and preventing settling of cuttings in the well when mud circulation is stopped. Drilling muds have been treated with various reagents to reduce the viscosity in order that the load on the pump which circulates the mud may thereby be reduced thus permitting the pump to handle more fluid. This also facilitates faster drilling of the bore hole. Another feature is that rock cuttings are permitted to settle out of the mud more rapidly and the tendencies of the mud to entrain gas is reduced. Other advantages of a mud of proper viscosity will be apparent to those skilled in the art of drilling wells.

It is an object of this invention to provide improved compositions useful as drilling muds.

It is another object of the invention to provide a method of improving the properties of drilling mud.

Various other objects and advantages will appear as the description of the invention proceeds.

It has now been found that the viscosity of a drilling mud can be effectively reduced by the addition of water soluble salts of green sulfonic acids. These acids are ordinarily obtained from the refining of mineral lubricating oil fractions in the course of treatment with fuming sulfuric or sulfuric acids. The acids react with the oil to form principally two types of sulfonic acids. The first type is oil-soluble sulfonic acid, usually called mahogany acid, which remains dissolved in the oil layer. The second type is the water-soluble sulfonic acid which remains in the sulfuric acid sludge layer and which is ordinarily called green sulfonic acid. It is with water-soluble salts of the latter type that this invention is concerned.

Inasmuch as only small quantities of the green sulfonic acid salts are required to effect substantial decreases in viscosities of drilling muds, it is not necessary that the salts be highly soluble. It is only necessary that sufficient of the salts dissolve in the mud to effect the desired reduction in viscosity. This is ordinarily not over about 3% by weight.

Salts of green sulfonic acids that may be used include those of the alkali metals, alkaline earth metals, heavy metals and salts formed by reaction of the green sulfonic acids with ammonia or organic bases of the type of triethanolamine.

In order to show the effectiveness of salts of green sulfonic acids for reducing the viscosity of drilling muds and to contrast the behavior of these salts with salts of oil-soluble or mahogany type sulfonic acids, numerous experiments were carried out. Typical results are shown in Table I.

*Table I*

| Sodium salt of green sulfonic acid added (per cent by weight) | Marsh viscosity 1500/1000 (seconds) of mud |
|---|---|
| 0 | 47 |
| 0.14 | 37 |
| 0.28 | 33 |

| Sodium salt of mahogany sulfonic acid added (per cent by weight) | Marsh viscosity 1500/1000 (seconds) of mud |
|---|---|
| 0 | 54 |
| 0.14 | 52 |
| 0.28 | 51 |

The sulfonic acid salts were added in the form of concentrated aqueous solution. In the case of the green acid salt, an aqueous solution containing 55% by weight of salt was employed and in the case of the mahogany salt, a 60% by weight solution was used. In all cases the content of sulfonic acid salt is shown on a dry basis. It will be seen that 0.14 by weight of the sodium salt of green sulfonic acid reduced the viscosity of a typical drilling mud from 47 to 37 seconds Marsh viscosity, whereas the same amount of the sodium salt of mahogany sulfonic acids did not effect a substantial reduction in the viscosity of a separate sample of the same drilling mud. The actual reduction effected was from 54 to 52 seconds. The viscosity of the drilling mud was further reduced by 4 seconds by increasing the amount of sodium salt of green sulfonic acid to 0.28. However, the addition of further sodium mahogany sulfonate effected reduction of only one second in viscosity, which is not a substantial change. The data clearly show that small quantities of the sodium salt of green sulfonic acid produce a substantial reduction in viscosity of drilling mud whereas equivalent amounts of the sodium salt of mahogany sulfonic do not effect a substantial change in viscosity. The salts may be suitably incorporated in the mud by simply mixing the salt thoroughly with the mud in any well-known manner. The amount of green acid salt required to effect the desired change in properties will vary with the particular salt and mud employed but in general will range from about 0.05% by weight to not substantially in excess of 1% by weight.

The foregoing description is only by way of illustration and not of limitation. It is not intended that the invention be limited by the foregoing details, but is to be restricted only by the appended claims.

What is claimed is:

1. The process of drilling wells which comprises circulating through the well bore during the drilling operation aqueous mud containing in solution a modicum of salt of green sulfonic acid.

2. Process in accordance with claim 1 in which the salt is an alkali metal salt.

3. Process in accordance with claim 1 in which the salt is sodium salt.

4. The process of drilling wells which comprises circulating through the well bore during the drilling operation aqueous mud containing in solution not substantially in excess of 1% by weight of alkali metal salt of green sulfonic acid.

5. The method of improving aqueous drilling mud which comprises incorporating in solution therein a modicum of salt of green sulfonic acid.

6. Method in accordance with claim 5 in which not substantially in excess of 1% by weight of alkali metal salt is incorporated in the mud.

7. Method in accordance with claim 5 in which the salt is sodium salt.

8. The method of improving aqueous drilling mud which comprises incorporating in solution therein approximately 0.5% by weight of sodium salt of green sulfonic acid.

HANS SCHINDLER.